United States Patent
Scherer et al.

(10) Patent No.: US 11,401,989 B2
(45) Date of Patent: Aug. 2, 2022

(54) DISC BRAKE APPLICATION DEVICE AND BEARING SHELL THEREFOR

(71) Applicant: WABCO Europe BVBA, Brussels (BE)

(72) Inventors: Vitalij Scherer, Leimen (DE); Hans-Christian Jungmann, Gorxheimertal (DE)

(73) Assignee: WABCO Europe BVBA, Brussels (BE)

( * ) Notice: Subject to any disclaimer, the term of this patent is extended or adjusted under 35 U.S.C. 154(b) by 96 days.

(21) Appl. No.: 16/772,308

(22) PCT Filed: Sep. 24, 2018

(86) PCT No.: PCT/EP2018/075778
§ 371 (c)(1),
(2) Date: Jun. 12, 2020

(87) PCT Pub. No.: WO2019/115037
PCT Pub. Date: Jun. 20, 2019

(65) Prior Publication Data
US 2021/0079964 A1    Mar. 18, 2021

(30) Foreign Application Priority Data
Dec. 14, 2017 (EP) .................................... 17207293

(51) Int. Cl.
| | | |
|---|---|---|
| *F16D 55/224* | (2006.01) | |
| *F16D 55/2255* | (2006.01) | |
| *F16C 35/04* | (2006.01) | |
| *F16D 65/18* | (2006.01) | |
| *F16D 125/32* | (2012.01) | |
| *F16D 125/64* | (2012.01) | |

(52) U.S. Cl.
CPC ........ *F16D 55/2255* (2013.01); *F16C 35/042* (2013.01); *F16D 65/183* (2013.01); *F16C 2361/45* (2013.01); *F16D 2125/32* (2013.01); *F16D 2125/64* (2013.01)

(58) Field of Classification Search
CPC ...... F16D 55/224; F16D 55/227; F16D 65/14; F16D 65/18; F16D 65/56
USPC .............................. 188/71.7–71.9, 72.7–72.9
See application file for complete search history.

(56) References Cited

FOREIGN PATENT DOCUMENTS

| DE | 10236606 A1 | 2/2004 |
|---|---|---|
| DE | 102010005909 A1 | 9/2011 |
| DE | 102010044911 A1 | 3/2012 |
| DE | 102012006089 A1 | 9/2013 |

(Continued)

OTHER PUBLICATIONS

European Patent Office, Rijswijk, Netherlands, International Search Report of International Application No. PCT/EP2018/075778, dated Feb. 5, 2019, 2 pages.

*Primary Examiner* — Christopher P Schwartz
(74) *Attorney, Agent, or Firm* — Dickinson Wright PLLC

(57) ABSTRACT

A brake application device for a disc brake, in particular for a sliding caliper disc brake, is configured for the application of a brake disc. The disc brake has at least one brake caliper for receiving the brake application device and brake linings for applying the brake disc. The brake application device includes a brake application lever having at least one brake application lever foot. The brake application lever foot has a recess for receiving a bearing shell in the direction of the side facing the brake lining or the side facing away from the brake lining.

14 Claims, 10 Drawing Sheets

(56) References Cited

FOREIGN PATENT DOCUMENTS

| | | | |
|---|---|---|---|
| DE | 102014115762 | A1 | 5/2016 |
| EP | 0 826 115 | A1 | 3/1998 |
| WO | 96/36819 | A1 | 11/1996 |
| WO | 2004/074705 | A1 | 9/2004 |

DISC BRAKE APPLICATION DEVICE AND BEARING SHELL THEREFOR

TECHNICAL FIELD

The invention relates to a brake application device for a disc brake, in particular for a sliding caliper disc brake of a commercial vehicle for the application of a brake disc. The disc brake has at least one brake caliper for receiving the brake application device and brake linings for applying the brake disc. The brake application device further comprises a brake application lever having at least one brake application lever foot. The brake application lever foot has a recess for receiving a bearing shell in the direction of the side facing the brake lining or the side facing away from the brake lining.

BACKGROUND

A brake application device referred to as a brake application mechanism in DE102010044911A1 has a pivotable lever with a supporting region configured as an eccentric. A bearing shell lies in a depression in the supporting region, wherein the bearing shell is held by a roller holder. The roller holder is fastened to the supporting region by rivets. The rivets have to be destroyed for dismantling purposes.

Another method for fastening the bearing shells to the brake application lever is disclosed in DE102012006089A1. In this case, the brake application lever is fork-shaped at the supporting regions. The supporting regions are configured as eccentric portions. The eccentric portions are supported by a supporting pin in each case via the bearing shells referred to as pivot bearings. The supporting pin is supported by the inside of the brake caliper.

In addition, WO04074705A1 shows a brake application device with a brake application lever. In this case, the bearing shells are fixedly connected to a supporting region configured as an eccentric. A roller is fitted in the bearing. The bearing shell, the roller and a receiving means form a bearing. A fixing of the bearing is achieved by means of a roller holder. The roller holder has loops in which bearing studs of the roller are inserted. The bearing shell is firmly pressed into bore holes of the supporting region by means of studs.

A brake application device with a brake application lever and bearing shells is also disclosed in DE102010005909A1. In this case, the supporting regions of the brake application lever have a bore in the center. The bearing shells each have a stud in the center. The bearing shells are inserted into the bores of the supporting regions by means of a press and drive connection and then pressed in. A high scrappage rate is associated with the pressing of the bearing shells into the supporting regions of the brake application lever, due to the breaking-off of the studs from the bearing shells, for example. In addition, many bearing shells drop out of the supporting regions of the bearing shell again after the pressing process, as a result of which there is an even higher scrappage rate of bearing shells.

SUMMARY

The present disclosure provides an improvement in the connection between the brake application lever and the bearing shell and reducing high scrappage costs caused by the bearing shells dropping out after the pressing process. Further, the present disclosure improves the machining of the bearing shell fixing to the brake application lever. The problem is solved in that pockets are arranged on the sides of a brake application lever foot for fixing a bearing shell. Particularly preferably, the pockets are arranged on the sides of the brake application lever foot in an axially parallel manner, starting from an imaginary axis of the brake application lever. The pockets arranged on the sides of the brake application lever foot simplify the connection and locking of the bearing shell to the brake application lever foot. A rotation or an offset arrangement of the bearing shell on the brake application lever foot is also prevented by the pockets of the brake application lever foot. Moreover, assembly costs are lowered by the omission of two bores in the brake application lever foot. The pockets of the brake application lever foot are preferably arranged on the brake application lever foot in an axially parallel manner.

In a further advantageous variant, the pockets are arranged symmetrically or asymmetrically on the brake application lever foot. With an asymmetric arrangement of the pockets of the brake application lever, coding is additionally possible. Only a bearing shell with the same coding as the coding of the pockets on the brake application lever foot is allowed to be assembled.

It has furthermore also proved advantageous for the pockets to be forged onto the brake application lever foot. The brake application lever is formed from a single forged part. During the forging process of the brake application lever, the pockets are additionally forged onto the brake application lever foot.

In a further advantageous embodiment, the pockets point in the direction of the side facing away from the brake lining or in the direction of the side facing the brake lining. Particularly preferably, the pockets have a phase for the introduction of the bearing shell. For the connection of the bearing shells to the brake application lever foot, it has proved advantageous for the recess of the brake application lever foot to be formed as a concave recess. The bearing shells are also concave in form, so that an accurately fitting connection between the brake application lever foot and the bearing shell is guaranteed.

In a further embodiment, the brake application lever foot has a blind hole in the recess on the side facing away from the brake lining or on the side facing the brake lining. The blind hole is machine-produced following the forging process of the brake application lever foot, for example by means of a drill. It is also possible, however, for the blind hole to be pre-forged, in other words manufactured during the forging process of the brake caliper foot.

Moreover, the brake application lever in a further advantageous embodiment has a first brake application lever foot with a first pocket and a second pocket and a second brake application lever foot with a third pocket and a fourth pocket.

The brake application lever is fork-shaped in design and has at least one arm on which a brake application lever foot for receiving a bearing shell is arranged. Particularly preferably, the brake application lever has two arms. The first pocket of the first brake application lever foot and the second pocket of the first brake application lever foot are arranged on the first brake application lever foot in an axially parallel manner. Furthermore, the third pocket of the second brake application lever foot and the fourth pocket of the second brake application lever foot are arranged on the second brake application lever foot in an axially parallel manner.

The problem is additionally solved in that lugs are arranged in the direction of the brake application lever on the sides of the bearing shell.

The lugs of the bearing shell are prestressed, as a result of which a force-fitting connection is created between the bearing shell and the brake application lever foot. Particularly preferably, the pockets of the bearing shell, starting from an imaginary axis of the bearing shell, are arranged in an axially parallel manner on the sides of the brake application lever foot.

It has furthermore been shown that the lugs of the bearing shell are advantageously arranged symmetrically or asymmetrically. The symmetrical arrangement of the lugs of the bearing shell or the asymmetrical arrangement of the lugs of the bearing shell create a coding which means that the bearing shell can be clearly assigned to a brake application lever or to a brake application lever foot.

In a further embodiment, the lugs are designed for fixing in the pockets of the brake application lever foot of the brake application lever. For an arrangement of the bearing shell on the brake application lever foot, the lugs of the bearing shell are pushed via the openings of the pockets of the brake application lever foot into the pockets of the brake application lever foot, so that the lugs of the bearing shell fix the bearing shell in a force-fitting manner.

Moreover, the lugs of the bearing shell in a further embodiment are wave-shaped. The ends of the lugs projecting from the bearing shell also have a tip with a centering. Prestressing is created via the wave shape of the lugs of the bearing shell, which allows the bearing shell to be fixed to the brake application lever foot in a force-fitting manner.

Furthermore, it has proved advantageous in a design variant for the bearing shell to have a stud on the side facing the brake application lever. The stud of the bearing shell is arranged on the bearing shell in an axially parallel manner. The stud of the bearing shell may, however, also be arranged in another region on the side of the bearing shell facing the brake application lever.

In a further embodiment, the stud of the bearing shell is arranged in a blind hole of the recess of the brake application lever foot. In the event that at least one lug should break away from the bearing shell, the bearing shell is secured to the brake application lever foot via the stud of the bearing shell.

In addition, in a further design variant the bearing shell has a semi-cylindrical shape. The side of the bearing shell pointing in the direction of the brake application lever foot or the bearing shell itself may also have a different geometry, however. The geometry of the surface of the bearing shell on which the brake application lever foot is arranged must at least have the same geometry as the surface of the brake application lever foot on which the bearing shell is arranged.

Selected exemplary embodiments of the invention are explained below with the help of the attached drawings.

DETAILED DESCRIPTION OF THE DRAWINGS

Figure 1:
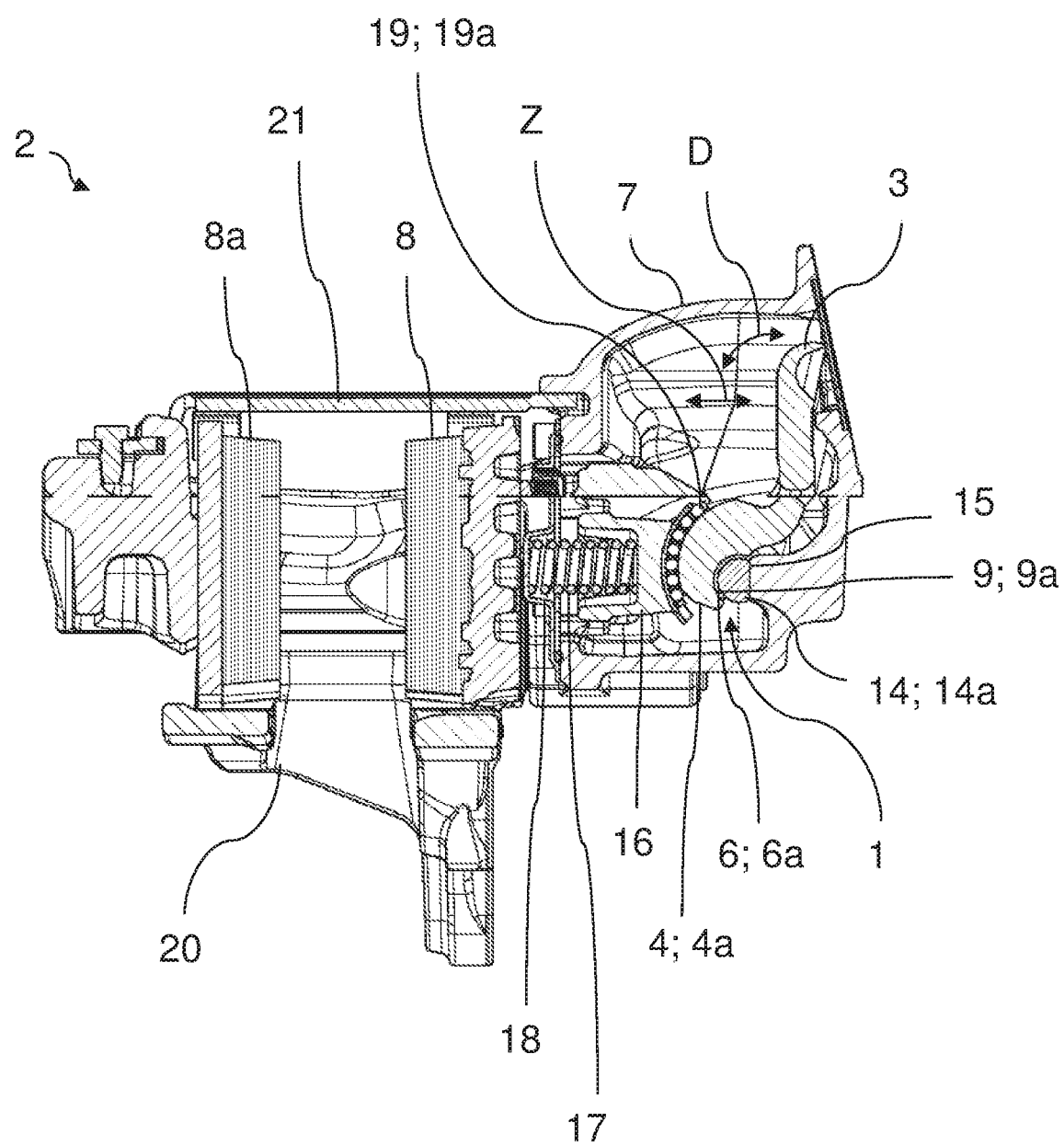
FIG. 1 shows a sectional side view of a disc brake.

FIG. 1 shows a disc brake 2 having a brake caliper 7, a brake carrier 20 for receiving brake linings 8, 8a, a lining support bracket 21 which keeps the brake linings 8, 8a in position, and a brake application lever 3, wherein the brake application lever 3 has two brake application lever feet 4, 4a. The brake application lever feet 4, 4a have recesses 9, 9a for receiving bearing shells 6, 6a. The brake application lever 3 is arranged within the brake caliper 7 of the disc brake 2 and is supported on the side facing away from the brake lining via two sliding blocks 14, 14a by an inner wall 15 of the brake caliper 7. The bearing shells 6, 6a are arranged between the sliding blocks 14, 14a and the brake application lever feet 4, 4a. In addition, the bearing shells 6, 6a allow a rotational movement D of the brake application lever 3. The brake application lever 3, the brake application lever feet 4, 4a, the bearing shells 6, 6a, a pressure piece 16, and also a screw that cannot be seen, and a die that cannot be seen which is arranged on the screw, form a brake application device 1. The brake application device 1 stresses the brake linings 8, 8a in the direction of a brake application movement Z. Following a brake application process, the brake application device 1 is reset into the initial state via the resetting spring 17, in the opposite direction to a brake application movement Z. The resetting spring 17 is supported in the direction of the brake linings 8, 8a by a cover plate 18 and in the direction of the brake application lever 3 by the pressure piece 16. Between the pressure piece 16 and the brake application lever feet 4, 4a are arranged slide bearings 19, 19a.

Figure 2:
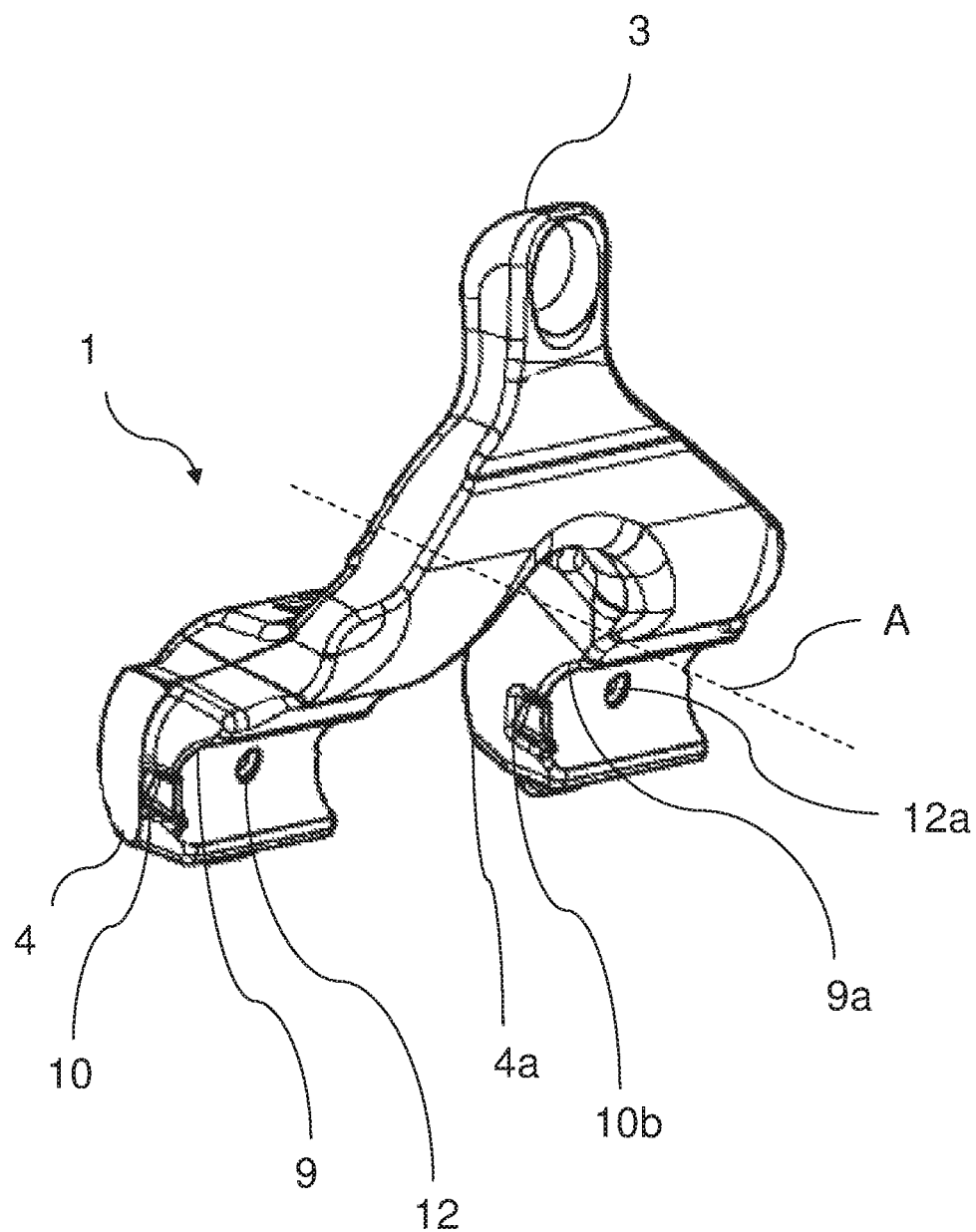
FIG. 2 shows a laterally rotated brake application lever without bearing shells and with blind holes in the brake application lever feet.
Figure 2A:
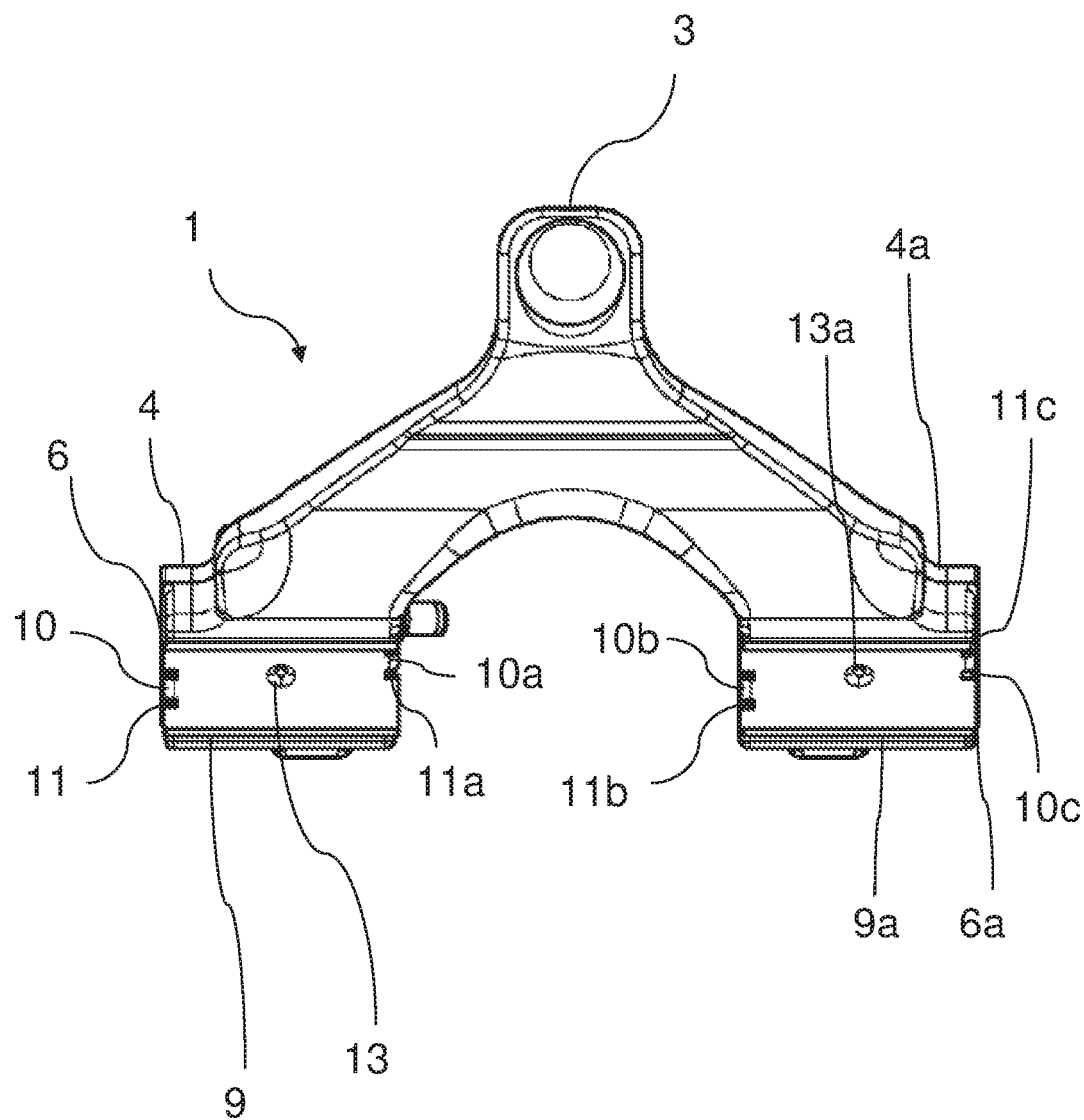
FIG. 2a shows a brake application lever in a frontal view with bearing shells.

FIG. 2 shows a brake application lever 3 according to FIG. 1 without bearing shells 6, 6a. A first pocket 10 of the first brake application lever foot 4 for fixing a first bearing shell 6 is arranged on the first brake application lever foot 4 (FIG. 1, FIG. 2a). A third pocket 10b of the second brake application lever foot 4a for fixing the second bearing shell 6a is arranged on the second brake application lever foot 4a. In addition, a first blind hole 12 is formed in the first recess 9 of the first brake application lever foot 4. A second blind hole 12a is arranged in the second recess 9a of the second brake application lever foot 4a. The blind holes 12, 12a of the recesses 9, 9a of the brake application lever feet 4, 4a receive studs 13, 13a (FIG. 2a, FIG. 2c) of the bearing shells 6, 6a. The recesses 9, 9a of the brake application lever feet 4, 4a are concave in design and extend perpendicularly in relation to an axis A of the brake application lever 3 over the entire width of the brake application lever feet 4, 4a.

FIG. 2a shows the frontal view of the brake application lever 3 according to FIGS. 1 and 2. The brake application lever 3 has two bearing shells 6, 6a on the brake application lever feet 4, 4a by comparison with the brake application lever 3 in FIG. 2. In this case, the first bearing shell 6 is arranged in the first recess 9 of the first brake application lever foot 4. The second bearing shell 6a is arranged in the second recess 9a of the second brake application lever foot 4a. Clearly recognizable is the asymmetric arrangement of the lugs 11, 11a of the first bearing shell 6 and the asymmetric arrangement of the lugs 11b, 11c of the second bearing shell 6a, and also the asymmetric arrangement of the pockets 10, 10a of the first brake application lever foot 4 and the asymmetric arrangement of the pockets 10b, 10c of the second brake application lever foot 4a. The first lug 11 of the first bearing shell 6 is fixed in a first pocket 10 of the first brake application lever foot 4 and the second lug 11a of the first bearing shell 6 is fixed in a second pocket 10a of the first brake application lever foot 4. In addition, the third lug 11b of the second bearing shell 6a is fixed in the third pocket 10b of the second brake application lever foot 4a and the fourth lug 11c of the second bearing shell 6a is fixed in the fourth pocket 10c of the second brake application lever foot 4a. As an additional safeguard against the first bearing shell 6 becoming detached from the first brake application lever foot 4, on the first bearing shell 6 the first stud 13 is introduced in the first blind hole 12 (FIG. 2) of the first brake application lever foot 4. Furthermore, in order to safeguard the second bearing shell 6a, the second stud 13a of the second bearing shell 6a is introduced in the second blind hole 12a (FIG. 2) of the second brake application lever foot 4a.

Figure 2B:
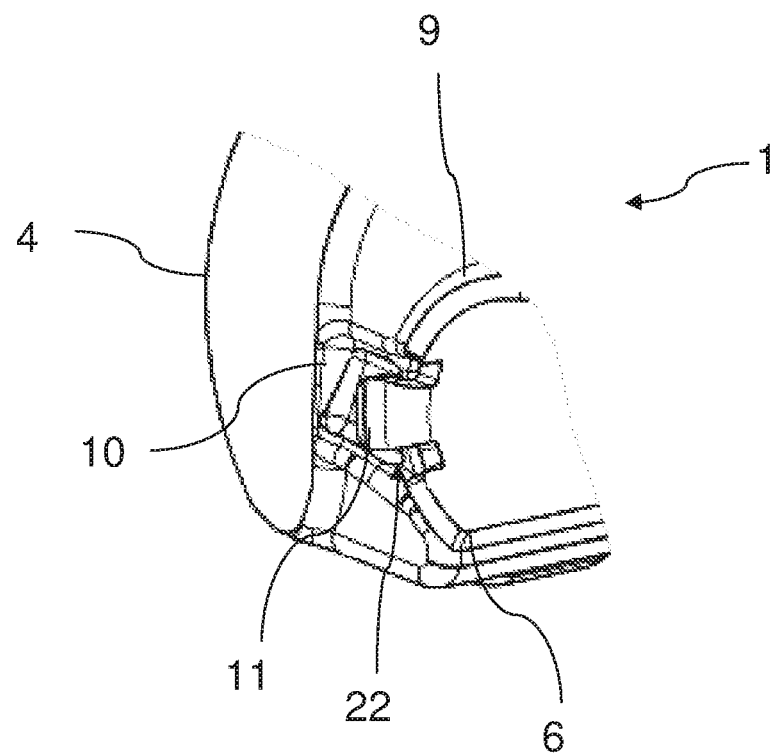
FIG. 2b shows a detail of a brake application lever foot with a bearing shell according to FIG. 2a, FIG. 2c shows a sectional schematic view of a brake application lever foot with a bearing shell and a blind hole in the bearing shell.

FIG. 2b shows in detail the fixing of the first bearing shell 6 on the first brake application lever foot 4 of the brake application lever 3 according to FIG. 2a. In particular, the arrangement of the first lug 11 of the first bearing shell 6 in the first pocket 10 of the first brake application lever foot 4 is shown. The first lug 11 of the first bearing shell 6 is pushed into the first pocket 10 of the first brake application lever foot 4 via an opening 22 in the first pocket 10.

Figure 2C:
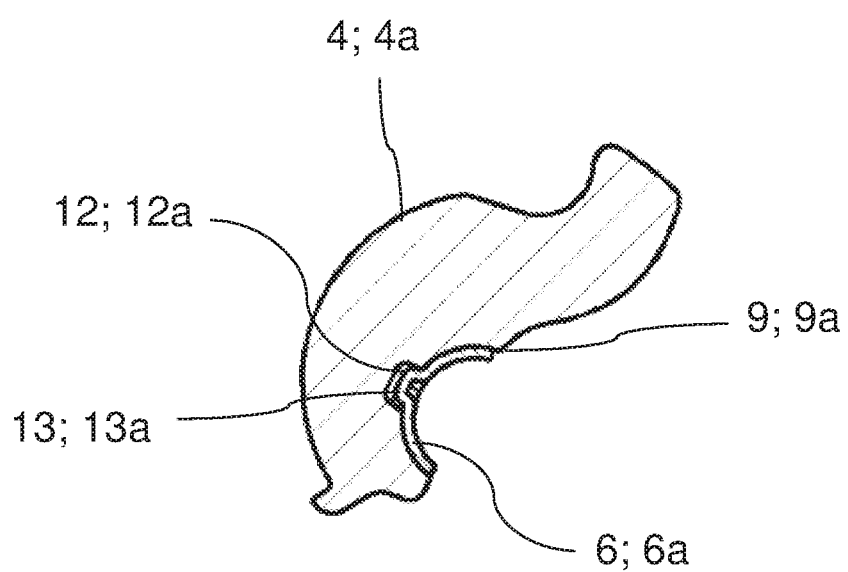

FIG. 2c shows the brake application lever 3 according to FIG. 2a, wherein the arrangement of the stud 13; 13a of the bearing shell 6; 6a in the blind hole 12; 12a in the recess 9; 9a of the brake application lever foot 4; 4a is shown in detail.

Figure 3:
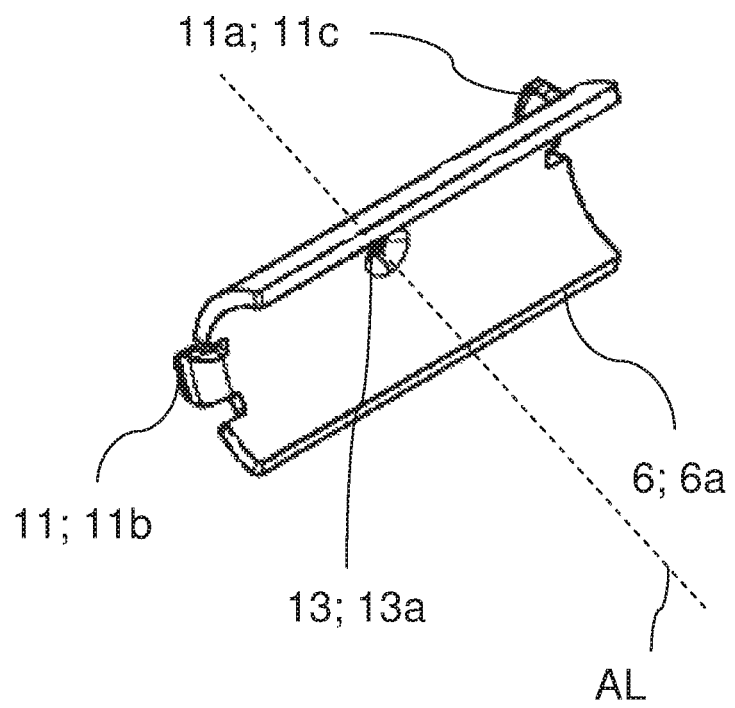
FIG. 3 shows a bearing shell with asymmetrically arranged lugs in a laterally rotated view.

The bearing shell 6; 6a with the two asymmetrically arranged lugs 11; 11b, 11a; 11c according to FIG. 2a is shown without the brake application lever 3 in FIG. 3. The axial direction of the bearing shell 6; 6a is depicted by an axis AL of the bearing shell 6, 6a.

Figure 3A:
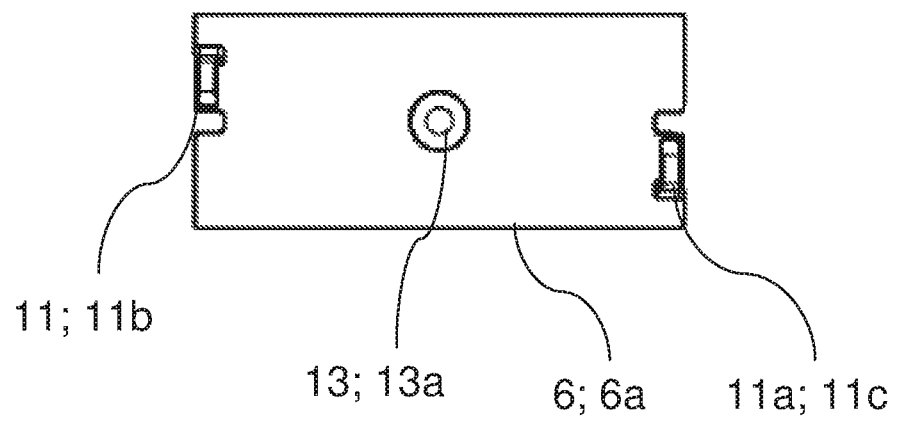
FIG. 3a shows a bearing shell with asymmetrically arranged lugs in a rear view.

FIG. 3a shows the bearing shell 6; 6a with the two asymmetrically arranged lugs 11; 11b, 11a, 11c according to FIG. 2a and FIG. 3 from the rear side of the bearing shell 6; 6a. The coaxially arranged stud 13; 13a of the bearing shell 6; 6a can clearly be identified.

Figure 4:
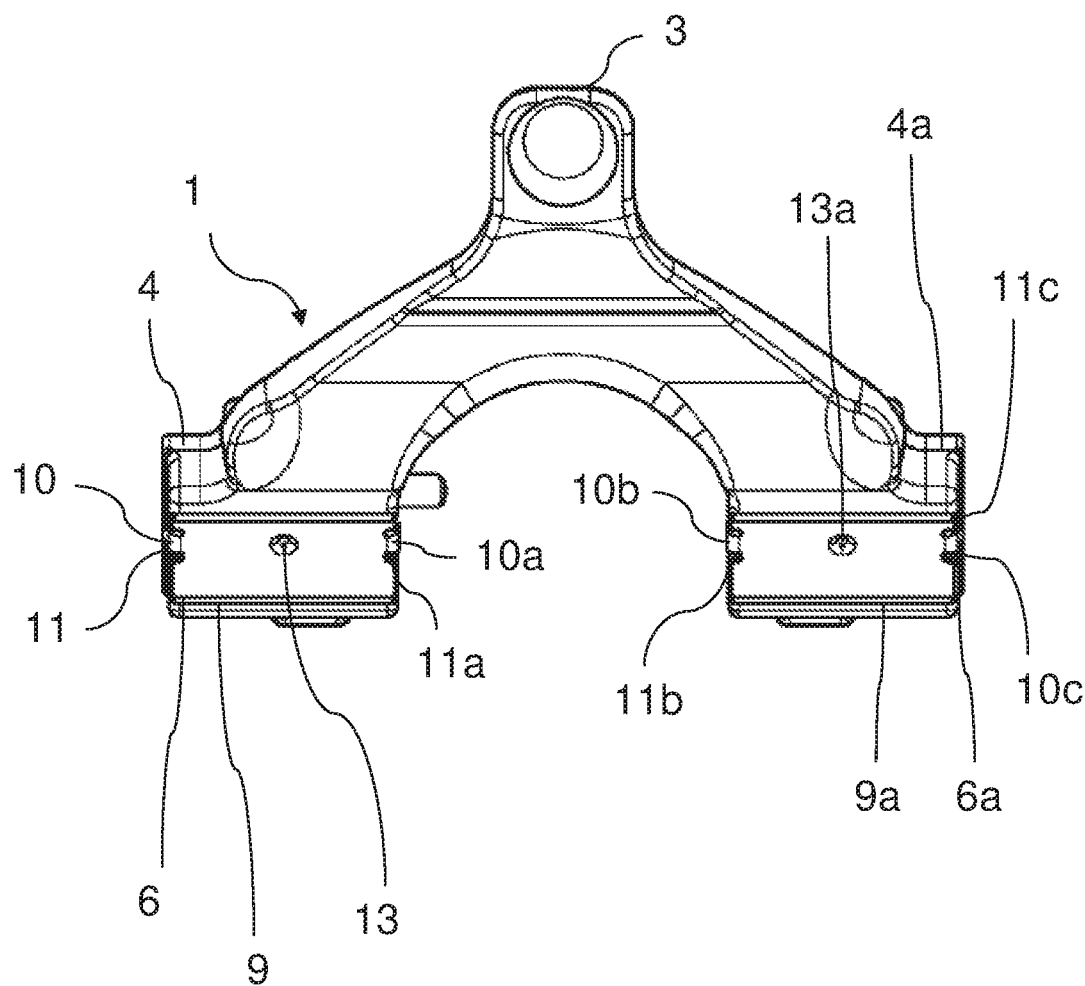
FIG. 4 shows a brake application lever with bearing shells, wherein the lugs of the bearing shells are arranged symmetrically.

FIG. 4 shows a brake application lever 3 according to FIG. 1 and FIG. 2, wherein the lugs 11, 11b, 11a, 11c of the bearing shells 6, 6a and the pockets 10, 10a, 10b, 10c of the brake application lever feet 4, 4a are arranged symmetrically. As an additional safeguard against detachment of the first bearing shell 6 from the first brake application lever foot 4, on the first bearing shell 6 the first stud 13 is introduced in the first blind hole 12 (FIG. 2) of the first brake application lever foot 4. Furthermore, in order to safeguard the second bearing shell 6a, the second stud 13a of the second bearing shell 6a is introduced in the second blind hole 12a (FIG. 2) of the second brake application lever foot 4a.

Figure 5:
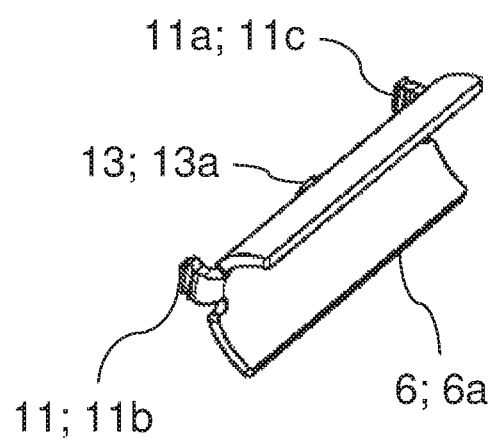
FIG. 5 shows a bearing shell with symmetrically arranged lugs in a laterally rotated view.

FIG. 5 shows the bearing shell 6; 6a with the symmetrically arranged lugs 11; 11b, 11a; 11c according to FIG. 4 without the brake application lever 3.

Figure 5A:
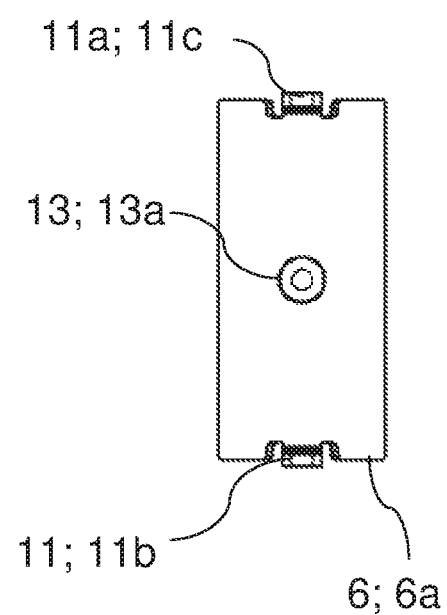
FIG. 5a shows a bearing shell with symmetrically arranged lugs in rear view.

FIG. 5a shows the bearing shell 6; 6a according to FIG. 4 and FIG. 5 from the rear view, wherein the coaxially arranged stud 13; 13a of the bearing shell 6; 6a can clearly be identified.

Figure 5B:
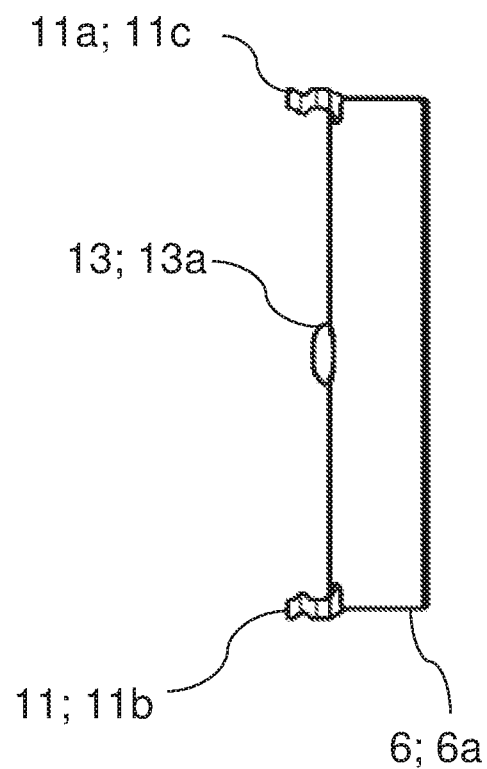
FIG. 5b shows a bearing shell with symmetrically arranged lugs from a plan view.

FIG. 5b also shows the bearing shell 6; 6a according to FIG. 4 to FIG. 5a. The bearing shell 6; 6a is shown in FIG. 5b from the plan view. In particular, the wave shape of the lugs 11; 11b, 11a; 11c of the bearing shell 6; 6a can be identified.

Figure 6:
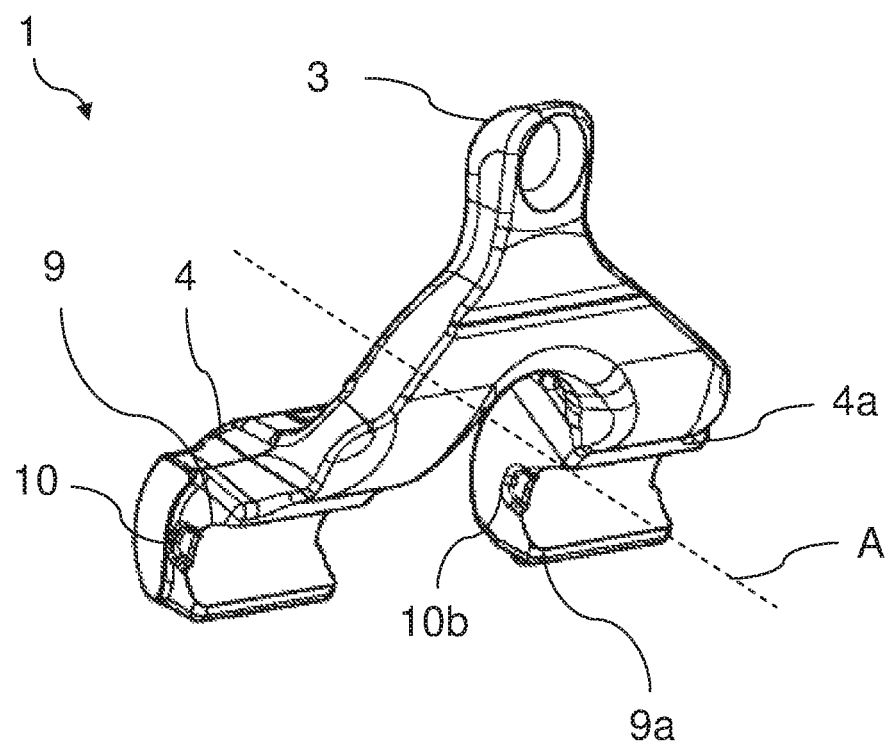
FIG. 6 shows a brake application lever without bearing shells and without blind holes in the recesses in the brake lever feet.

FIG. 6 shows the brake application lever 3 according to FIG. 1 and FIG. 2. Unlike in FIG. 2, the recesses 9, 9a of the brake application lever feet 4, 4a exhibit no blind holes 12, 12a.

Figure 6A:
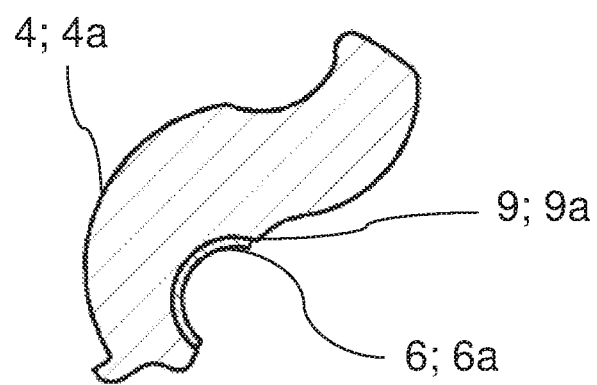
FIG. 6a shows a sectional schematic view of a brake application lever foot with a bearing shell and without a blind hole in the bearing shell.

FIG. 6a illustrates the arrangement of the bearing shell 6; 6a in the recess 9; 9a of the brake application lever foot 4; 4a according to the embodiment of the brake application lever 3 in FIG. 6.

Figure 7:
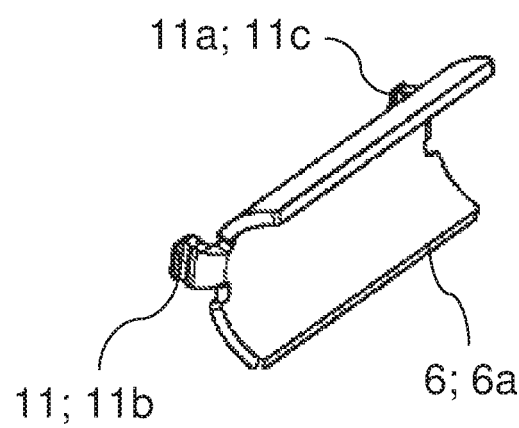
FIG. 7 shows a bearing shell without a stud in a laterally rotated view.

A corresponding bearing shell 6; 6a for a brake application lever 3 according to FIG. 6 is shown in FIG. 7. The bearing shell 6; 6a has two symmetrically arranged lugs 11; 11b, 11a; 11c. There is no additional stud 13; 13a of the bearing shell 6; 6a.

Figure 7A:
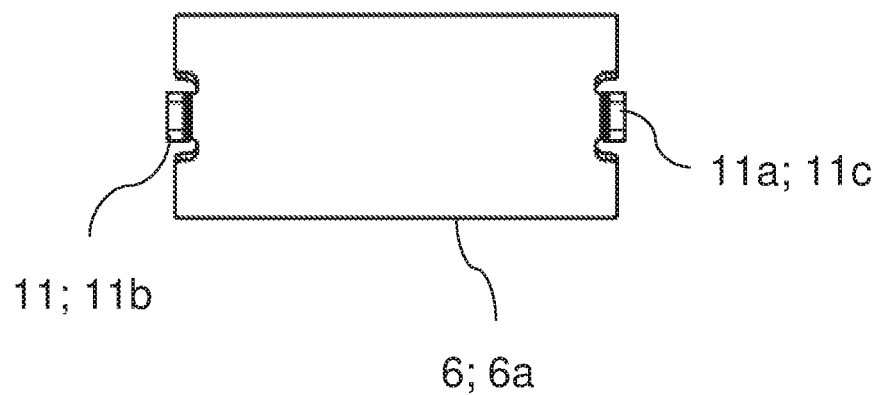
FIG. 7a shows a bearing shell without a stud in a rear view.

FIG. 7a shows once again the rear side of the bearing shell 6; 6a according to FIG. 7. It can clearly be seen that the bearing shell 6; 6a has no stud 13; 13a.

LIST OF REFERENCE NUMBERS AS PART OF THE DESCRIPTION brake application device
2 disc brake
3 brake application lever
4 first brake application lever foot
4a second brake application lever foot
6, 6a bearing shell
7 brake caliper
8, 8a brake lining
9, 9a recess of the brake application lever foot 4, 4a
10 first pocket of the brake application lever foot 4
10a second pocket of the brake application lever foot 4
10b third pocket of the brake application lever foot 4a
10c fourth pocket of the brake application lever foot 4a
11-11c lug of the bearing shell 6, 6a
12, 12a blind hole in the recess 9, 9a of the brake application lever foot 4, 4a
13, 13a stud of the bearing shell 6, 6a
14, 14a sliding block
15 inner wall of the brake caliper 7
16 pressure piece
17 reset spring
18 cover plate
19, 19a slide bearing
20 brake carrier
21 lining support bracket
22 opening in the first pocket 10 of the first brake application lever foot 4
A axis of the brake application lever 3
AL axis of the bearing shell
D rotational movement of the brake application lever 3

Z brake application movement

The invention claimed is:

1. A brake application device (1) for a disc brake (2), wherein the disc brake (2) has at least one brake caliper (7) for receiving the brake application device (1) and brake linings (8; 8a) for applying the brake disc, the brake application device (1) comprising:
a brake application lever (3) having at least one brake application lever foot (4; 4a), wherein the brake application lever foot (4; 4a) has a recess (9; 9a) for receiving a bearing shell (6; 6a) on a side facing the brake lining (8; 8a) or on a side facing away from the brake lining (8, 8a), the brake application lever foot having pockets (10, 10a; 10b, 10c) on lateral sides of the brake application lever that face laterally relative to a brake application direction, the pockets configured for fixing the bearing shell (6; 6a).

2. The brake application device (1) as claimed in claim 1, wherein the pockets (10, 10a, 10b, 10c) are arranged symmetrically or asymmetrically on the brake application lever foot (4, 4a).

3. The brake application device (1) as claimed in claim 1, wherein the pockets (10, 10a; 10b, 10c) are formed in the brake application lever foot (4; 4a) during a forging process of the brake application lever (3).

4. The brake application device (1) as claimed in claim 1, wherein the pockets (10, 10a; 10b, 10c) point away from the brake lining (8; 8a) or toward the brake lining (8; 8a).

5. The brake application device (1) as claimed in claim 1, wherein the recess (9; 9a) of the brake application lever foot (4; 4a) is formed as a concave recess.

6. The brake application device (1) as claimed in claim 1, wherein the brake application lever foot (4; 4a) has a blind hole (12; 12a) in the recess (9; 9a).

7. A brake application device (1) for a disc brake (2), wherein the disc brake (2) has at least one brake caliper (7) for receiving the brake application device (1) and brake linings (8; 8a) for applying the brake disc, the brake application device (1) comprising:
a brake application lever (3) having at least one brake application lever foot (4; 4a), wherein the brake application lever foot (4; 4a) has a recess (9; 9a) for receiving a bearing shell (6; 6a) on a side facing the brake lining (8; 8a) or on a side facing away from the brake lining (8, 8a), the brake application lever foot having pockets (10, 10a; 10b, 10c) on lateral sides for fixing the bearing shell (6; 6a);
wherein the brake application lever (3) has a first brake application lever foot (4) with a first pocket (10) and a second pocket (10a) and that the brake application lever (3) has a second brake application lever foot (4a) with a third pocket (10b) and a fourth pocket (10c).

8. A bearing shell (6; 6a) for a brake application device (1) for a disc brake (2) wherein the disc brake (2) has at least one brake caliper (7) for receiving the brake application device (1) and brake linings (8; 8a) for applying the brake disc, the brake application device (1) comprising:
a brake application lever (3) having at least one brake application lever foot (4; 4a), wherein the brake application lever foot (4; 4a) has a recess (9; 9a) for receiving the bearing shell (6; 6a) on a side facing the brake lining (8; 8a) and in the direction of the side facing the brake lining (8; 8a) or on a side facing away from the brake lining (8; 8a) and in the direction of the side facing away from the brake lining (8; 8a), the brake application lever foot having pockets (10, 10a; 10b, 10c) on lateral sides for fixing the bearing shell (6; 6a);
the bearing shell (6; 6a) comprising lugs (11, 11a; 11b, 11c) arranged on lateral sides of the bearing shell, the lugs projecting toward the brake application lever (3).

9. The bearing shell (6; 6a) as claimed in claim 8, wherein the lugs (11, 11a; 11b, 11c) of the bearing shell (6; 6a) are arranged symmetrically or asymmetrically.

10. The bearing shell (6; 6a) as claimed in claim 8, wherein the lugs (11, 11a; 11b, 11c) of the bearing shell (6, 6a) are configured for engaging the pockets (10, 10a; 10b, 10c) of the brake application lever foot (4; 4a) of the brake application lever (3).

11. The bearing shell (6; 6a) as claimed in claim 8, wherein the lugs (11, 11a; 11b, 11c) of the bearing shells (6; 6a) are wave-shaped.

12. The bearing shell (6; 6a) as claimed in claim 8, wherein the bearing shell (6; 6a) has a stud (13; 13a) on a side facing the brake application lever (3).

13. The bearing shell (6; 6a) as claimed in claim 12, wherein the stud (13; 13a) of the bearing shell (6; 6a) is configured to engage a blind hole (12; 12a) of the recess (9; 9a) of the brake application lever foot (4; 4a).

14. The bearing shell (6; 6a) as claimed in claim 8, wherein the bearing shell (6; 6a) has a semi-cylindrical shape.

* * * * *